No. 607,960. Patented July 26, 1898.
J. E. SCHLIEPER.
SECTIONAL FEED WATER HEATER.
(Application filed May 11, 1897.)

(No Model.) 6 Sheets—Sheet 3.

WITNESSES:
William J. Brown.
W F Kenna

INVENTOR
J. E. Schlieper
BY John H Rosey
his
ATTORNEY.

No. 607,960. Patented July 26, 1898.
J. E. SCHLIEPER.
SECTIONAL FEED WATER HEATER.
(Application filed May 11, 1897.)

(No Model.) 6 Sheets—Sheet 4.

WITNESSES:
William J. Brown.
W. F. Kenna

INVENTOR
J. E. Schlieper
BY John H. Roney
his
ATTORNEY.

THE NORRIS PETERS CO., PHOTO-LITHO., WASHINGTON, D. C.

No. 607,960. Patented July 26, 1898.
J. E. SCHLIEPER.
SECTIONAL FEED WATER HEATER.
(Application filed May 11, 1897.)
(No Model.) 6 Sheets—Sheet 5.
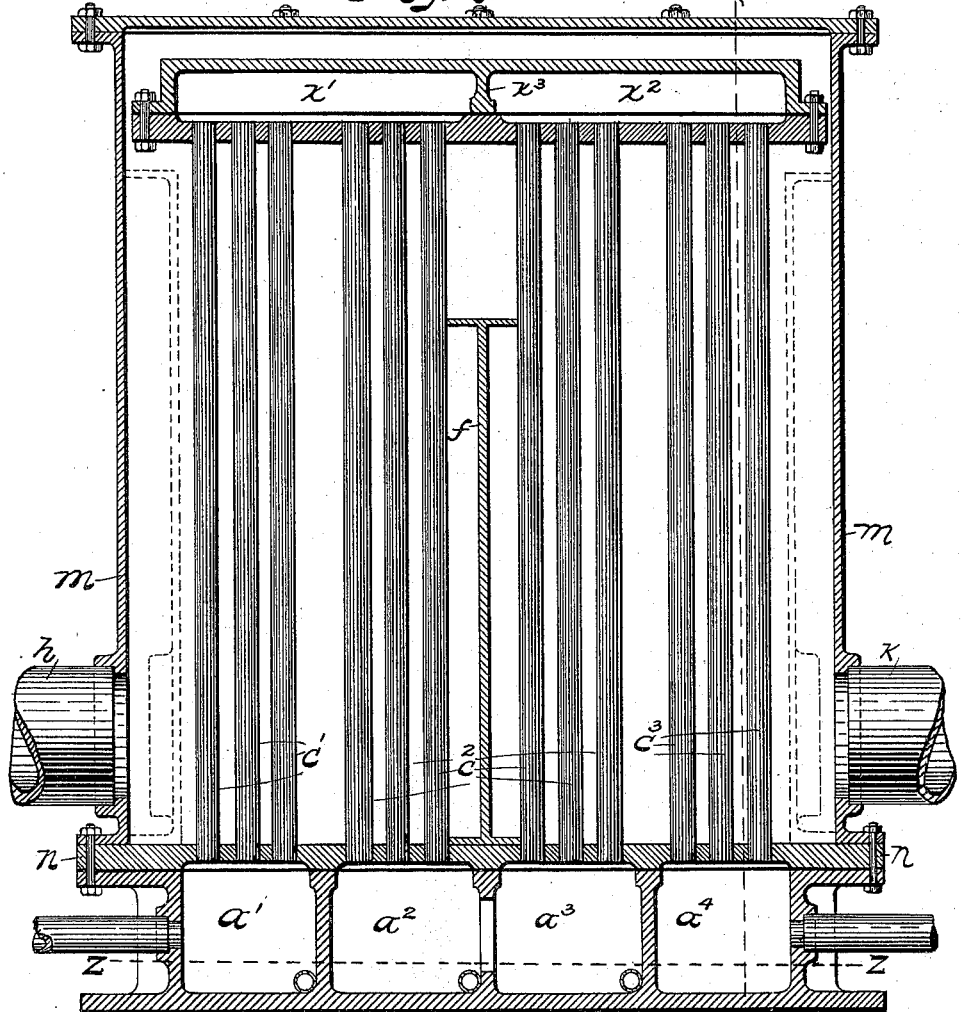
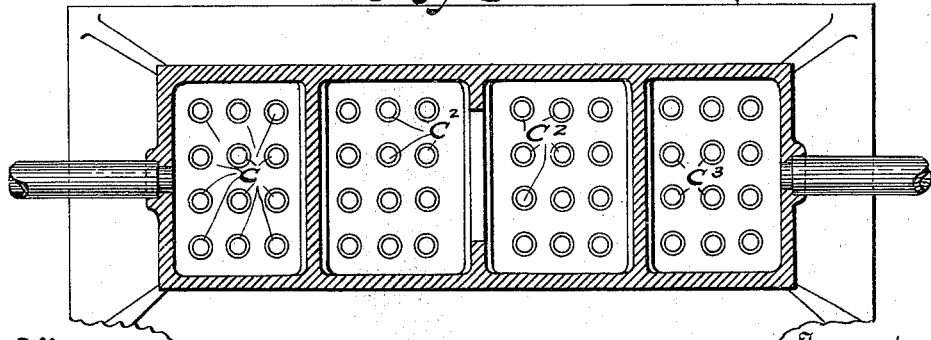
Witnesses
William J. Brown.
W. F. Kennd
Inventor
J. E. Schlieper
By his Attorney John H. Roney
THE NORRIS PETERS CO., PHOTO-LITHO., WASHINGTON, D. C.

No. 607,960. Patented July 26, 1898.
J. E. SCHLIEPER.
SECTIONAL FEED WATER HEATER.
(Application filed May 11, 1897.)

(No Model.) 6 Sheets—Sheet 6.

UNITED STATES PATENT OFFICE.

JOHN E. SCHLIEPER, OF ALLEGHENY, PENNSYLVANIA.

SECTIONAL FEED-WATER HEATER.

SPECIFICATION forming part of Letters Patent No. 607,960, dated July 26, 1898.

Application filed May 11, 1897. Serial No. 636,126. (No model.)

*To all whom it may concern:*

Be it known that I, JOHN E. SCHLIEPER, a citizen of the United States, residing at Allegheny, in the county of Allegheny and State of Pennsylvania, have invented certain new and useful Improvements in Sectional Feed-Water Heaters; and I do declare the following to be a full, clear, and exact description of the invention, such as will enable others skilled in the art to which it appertains to make and use the same, reference being had to the accompanying drawings, and to the letters of reference marked thereon, which form a part of this specification, in which—

Figure 1:
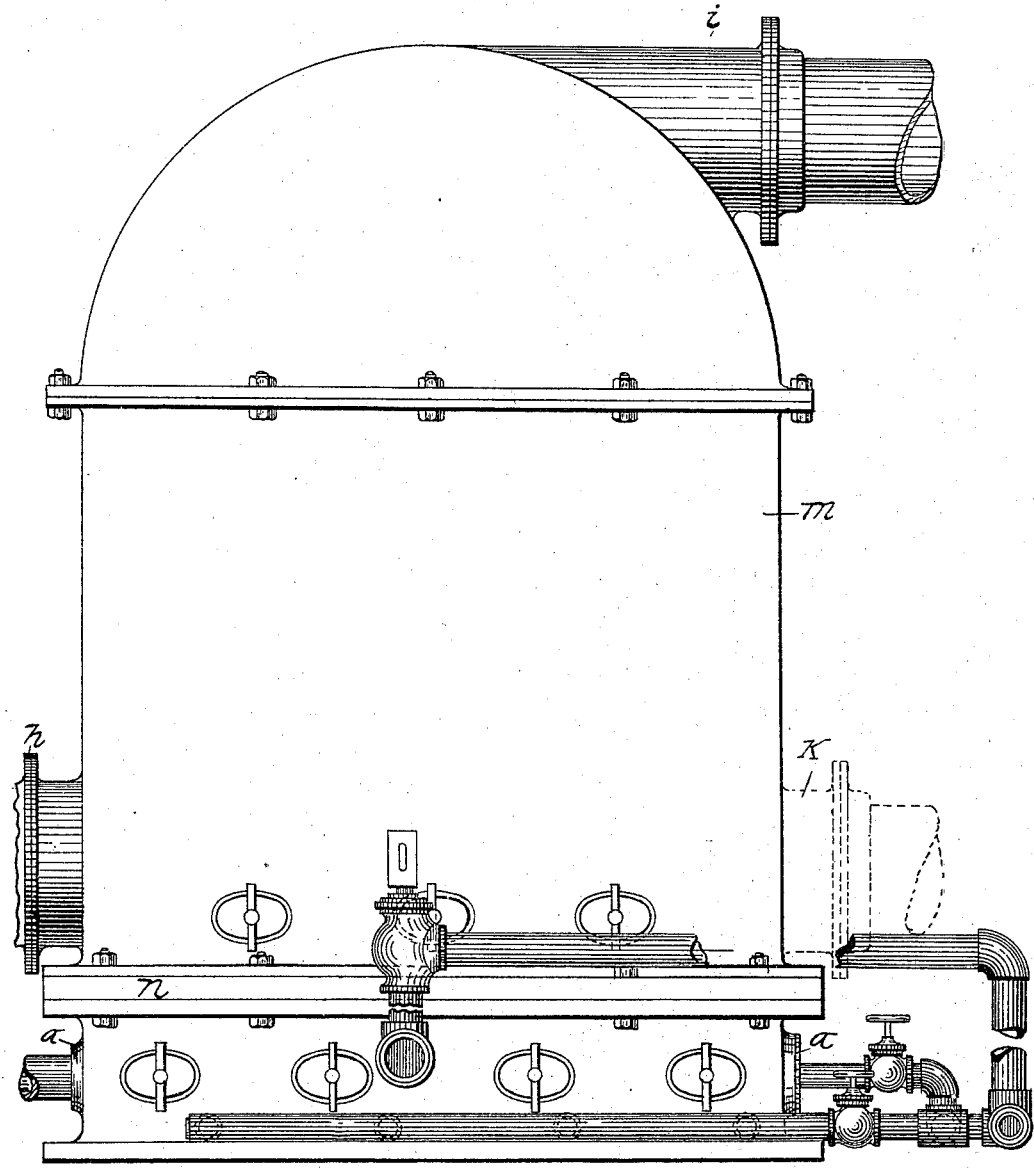
Figure 2:
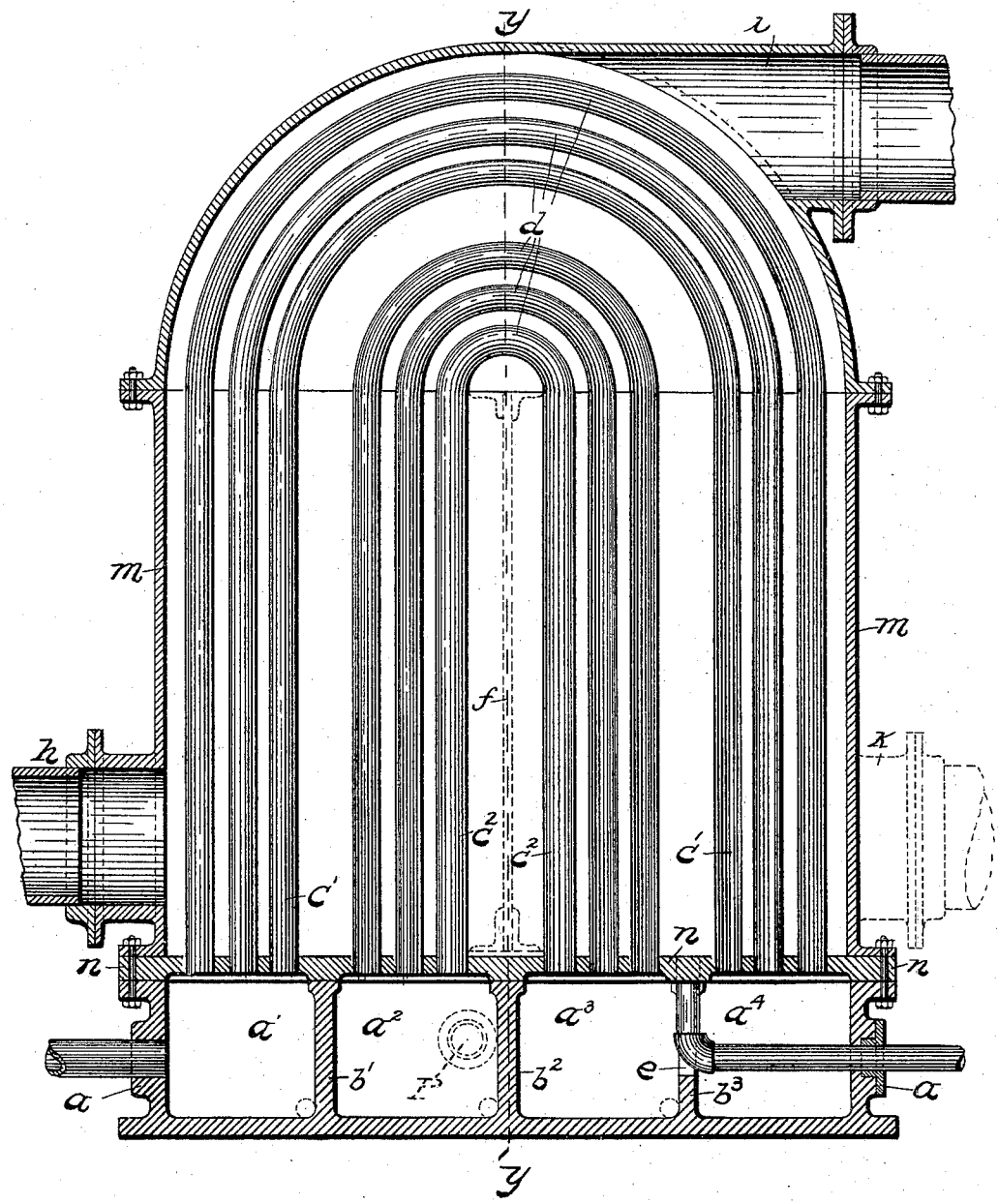
Figure 3:
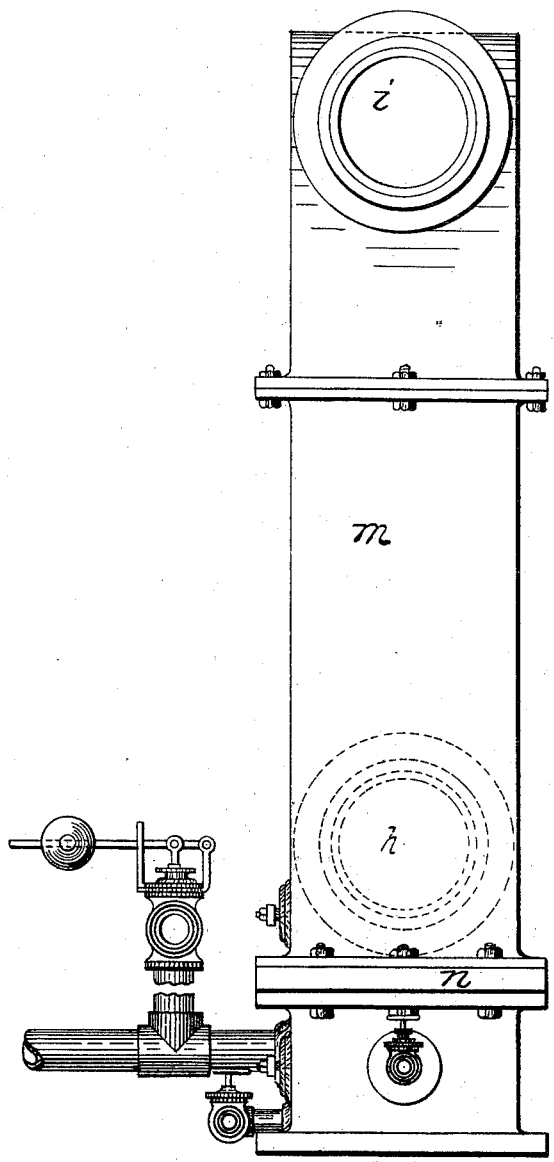
Figure 4:
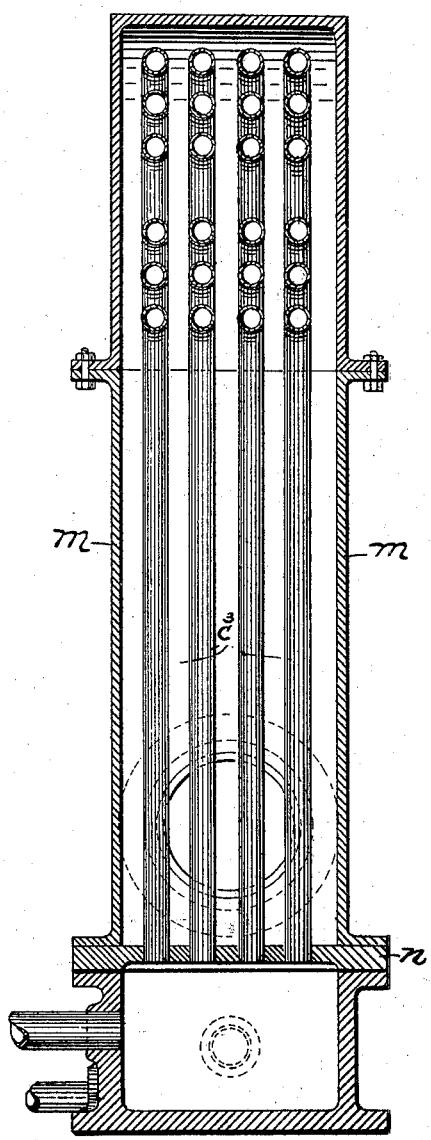
Figure 5:
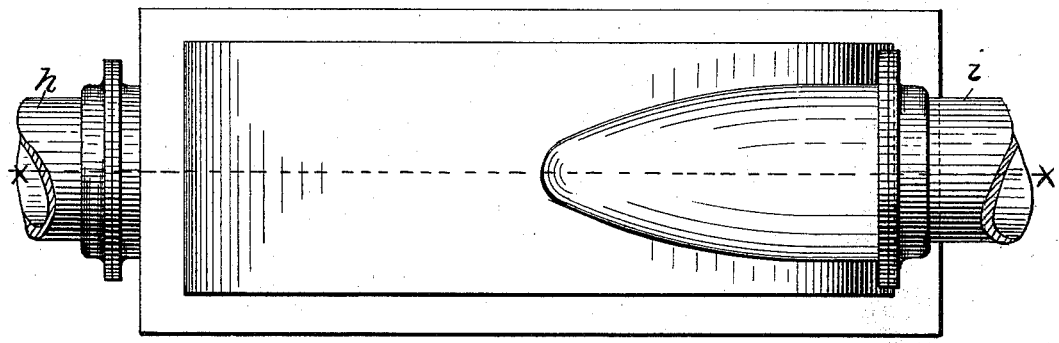
Figure 6:
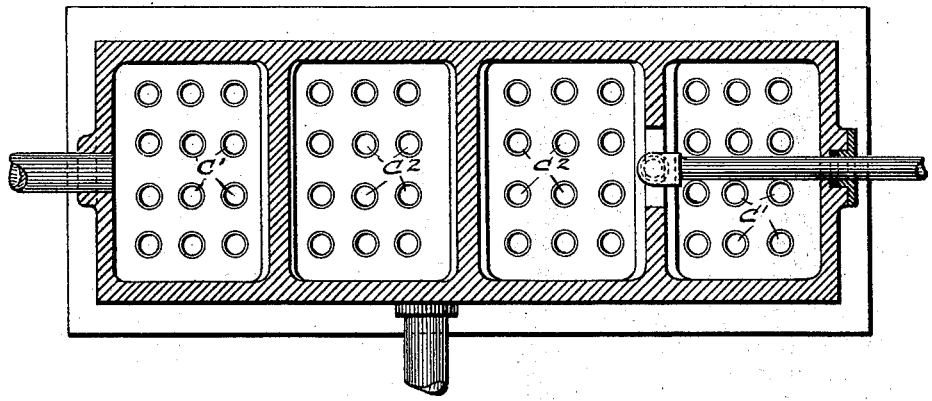
Figure 9:
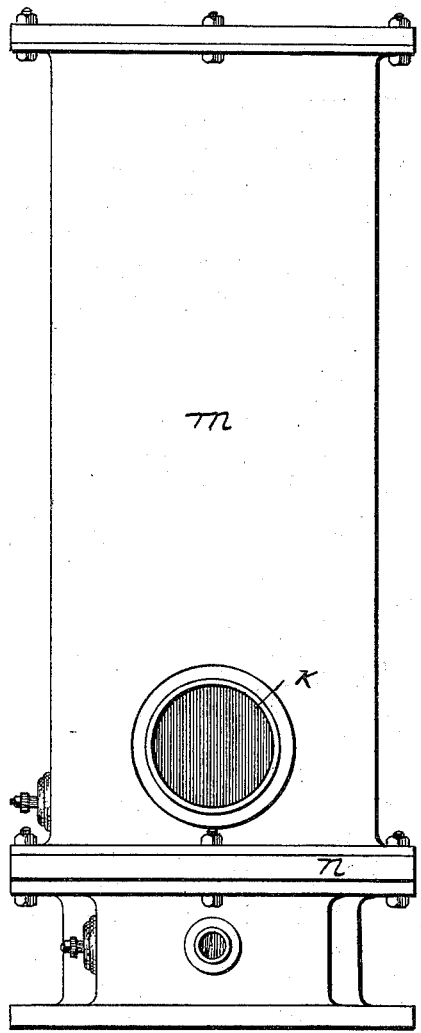
Figure 10:
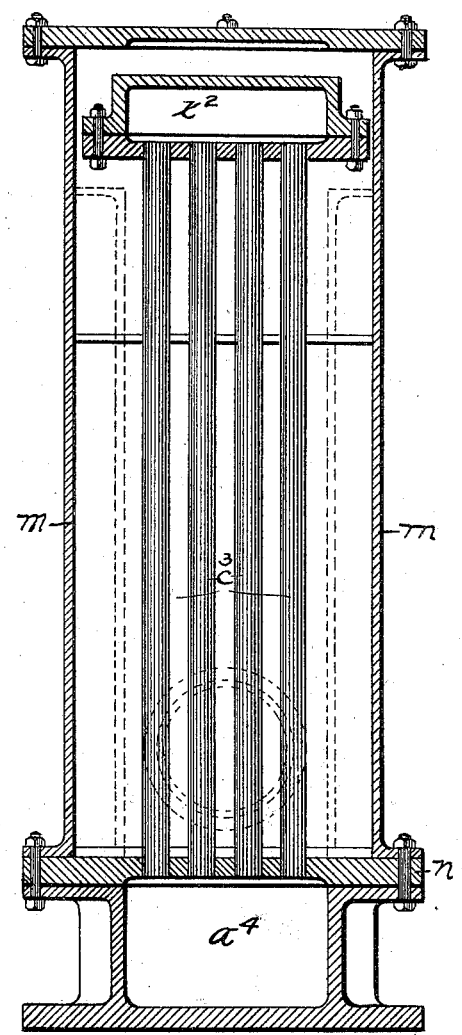

Figure 1 indicates a side elevation of my improved sectional feed-water heater. Fig. 2 is a section of the same through the line $x\ x$ of Fig. 6. Fig. 3 is an end elevation of the same. Fig. 4 is a vertical end section through lines $y\ y$ of Figs. 1 and 2. Fig. 5 is a plan of the same. Fig. 6 is a transverse section on lines $a\ a$ of Figs. 1 and 2, looking upwardly. Fig. 7 is a sectional elevation of a modification of my improved heater. Fig. 8 is an inverted transverse section on lines $z\ z$ of Fig. 7. Fig. 9 is an end elevation of the same. Fig. 10 is a vertical section on lines $w\ w$ of Fig. 7.

The object of my invention is to obtain the maximum water-heating surface with the minimum surface liable to incrustation.

In the base of the heater are formed four chambers $a'\ a^2\ a^3\ a^4$, two of which are connected together, while the others are quite separate. Fig. 2 shows the connection between the two right-hand chambers $a^3\ a^4$, whereas in Fig. 7 the middle chambers $a^2\ a^3$ are thus connected. Arched pipes $c'$, arranged in series, extend from the extreme left-hand chamber $a'$ to the extreme right-hand chamber $a^4$, and similar pipes $c^2$ in like manner connect the chambers $a^2\ a^3$ together, as shown in Fig. 2, or, as shown in Fig. 7, I may employ vertical pipes $c'\ c^2\ c^3$ to connect the four lower chambers to two upper chambers, which communicate through an opening in their partition $x^3$—that is, the pipes of series $c'$ will connect chamber $a'$ to chamber $x'$, the pipes of series $c^3$ will connect chamber $a^4$ to chamber $x^2$, and the pipes of the intermediate two series $c^2$ connect, respectively, chamber $a^2$ to chamber $x'$ and chamber $a^3$ to chamber $x^2$.

In the several figures, $m$ designates the casing; $n$, the cover of the lower chambers $a'$, $a^2$, $a^3$, and $a^4$, to which the lower ends of the said pipes are firmly secured and which is bolted to the said base and casing; $h$, a steam-inlet, and $i$ and $k$ represent exhaust-tubes taking steam respectively from the side and the top of the heater. A deflector $f$ is arranged under the arch $d$ of pipes $c^2$ for the purpose of causing the steam to flow around the said pipes on its way through the heater.

In Fig. 2 the partitions between the chambers $a'$, $a^2$, $a^3$, and $a^4$ are designated, respectively, $b'$, $b^2$, and $b^3$, the opening through the latter being designated $e$. The feed-water is preferably admitted into chamber $a^2$ at $p$, dotted lines, and passes through pipes $c^2$ to chamber $a^3$, thence through opening $e$ to chamber $a^4$, thence through pipes $c'$ to chamber $a'$, and out to the boiler, being thoroughly heated by the steam in this tortuous passage.

The base, which incloses the chambers $a'$, $a^2$, $a^3$, and $a^4$, supports the casing and pipes, as well as the deflector and all other elements of the body of the heater, and also provides in said chambers an important part of the said passage. Its cover or top $n$ is a flat plate well adapted to be bolted to the flanges of the parts immediately above and below it.

Having thus described my invention, what I claim as new, and desire to secure by Letters Patent, is—

A casing $m$, in combination with a series of chambers $a'\ a^2\ a^3\ a^4$, the two latter of which are directly in communication with each other, a series of arched pipes $c'$ making communication between chambers $a'$ and $a^4$, a series of arched pipes $c^2$ making communication between chambers $a^2\ a^3$, and means for supplying steam to the space around the said pipes and a water inlet and outlet arranged to cause the flow of water through all the chambers and series of pipes in succession substantially as and for the purpose set forth.

In testimony whereof I hereunto set my hand and affix my seal this 6th day of January, A. D. 1897.

J. E. SCHLIEPER. [L. S.]

In presence of—
ALBERT J. WALKER,
W. J. BROWN.